United States Patent [19]

Moser et al.

[11] Patent Number: 5,048,042
[45] Date of Patent: Sep. 10, 1991

[54] CATALYTIC METHOD FOR INHIBITING DEPOSIT FORMATION IN METHANE RAMAN CELLS

[75] Inventors: Thomas P. Moser, Redondo Beach; Donald R. Dewhirst, Torrance, both of Calif.

[73] Assignee: Hughes Aircraft Company, Los Angeles, Calif.

[21] Appl. No.: 615,118

[22] Filed: Nov. 19, 1990

[51] Int. Cl.$^5$ ................................................ H01S 3/22
[52] U.S. Cl. .......................................... 372/59; 372/3
[58] Field of Search ...................................... 372/3, 59

[56] References Cited

U.S. PATENT DOCUMENTS 4,327,337  4/1982  Liu .
4,751,714  6/1988  Chen ........................................ 372/3
4,816,289  3/1989  Komatsu et al. ................. 423/447.3

Primary Examiner—Léon Scott, Jr.
Attorney, Agent, or Firm—Mary E. Lachman; W. J. Streeter; W. K. Denson-Low

[57] ABSTRACT

A methane Raman cell is provided with a catalytic composite comprising palladium on a titania substrate, which promotes the hydrogenation of gas products formed by the decomposition of methane from arcing, and thereby inhibits the reaction of these gas products to form deposits which adhere to the windows of the Raman cell. This Raman cell has greatly increased life. In an alternative embodiment, further improvements may be obtained by adding hydrogen dopant gas to the methane.

15 Claims, 1 Drawing Sheet

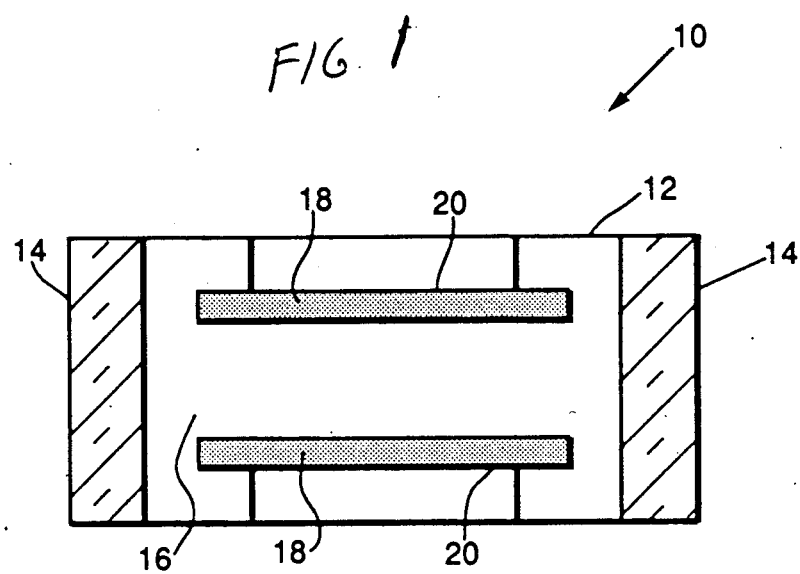

1

CATALYTIC METHOD FOR INHIBITING DEPOSIT FORMATION IN METHANE RAMAN CELLS

BACKGROUND OF THE INVENTION

1. Field of the Invention

The present invention relates generally to a catalytic method for inhibiting the plasma polymerization of methane. More particularly, the present invention relates to the use of a palladium catalyst on a titania substrate in a Raman laser cell comprising methane, to inhibit the formation of deposits on the windows of the Raman cell. The present invention also relates to an improved Raman laser cell incorporating such a catalytic composite.

2. Description of Related Art

Raman laser cells are often used in laser systems to shift the frequency of the laser output beam from one wavelength to another. The Raman laser cell contains a selected gaseous scattering medium with which the pump beam interacts and is thereby converted to a second beam of a different wavelength. The structure and function of such Raman laser cells are well known in the art and will not be detailed here. Because of its high Raman scattering coefficient, methane is a useful gaseous medium for Raman cells. However, it has been found that methane decomposes when subjected to the high intensity beam of the pump laser and leads to the formation of deposits on the cell windows which degrade cell performance.

One approach to this problem is described in U.S. Pat. No. 4,751,714 to Da-Wun Chen, where the difficulty is attributed to the spontaneous decomposition of methane into carbon and hydrogen when subjected to a high intensity beam. The carbon formed then deposits on the inside of the transparent windows of the Raman cell and degrades transmission through these windows. Chen added free gaseous hydrogen to the cell in an attempt to maintain the decomposition and recombination reactions for methane in equilibrium and thus prevent the deposition of carbon particles on the cell window. While this method may lessen the problem with regard to carbon deposits, it does not prevent the build-up of organic deposits on the windows, and thus does not provide a completely satisfactory solution.

Thus, a present need exists to provide an effective method for preventing the formation of deposits on the optical windows of a Raman cell using methane gas as the scattering medium. There is also a need for an improved Raman cell in which deposits are not formed on the optical windows.

SUMMARY OF THE INVENTION

The general purpose of this invention is to provide a method for inhibiting the formation of deposits on the windows of a methane Raman cell. This method possesses all of the advantages of the prior methods discussed above while overcoming their above-noted significant disadvantages.

The above general purpose of the present invention is accomplished by providing a catalytic composite comprising palladium on a titania substrate, which promotes the hydrogenation of radicals formed from methane by arcing and thereby inhibits the reaction of these radicals to form deposits which adhere to the windows of the Raman cell. In an alternative embodiment of the present invention, further improvements may be obtained by adding hydrogen dopant gas to the methane. An improved Raman cell including this catalytic composite is also provided in accordance with the present invention.

The above-discussed and many other features and attendant advantages of the present invention will become better understood by reference to the following detailed description.

BRIEF DESCRIPTION OF THE DRAWINGS

The figure is a schematic representation of one embodiment of the Raman laser cell of the present invention.

DESCRIPTION OF THE PREFERRED EMBODIMENTS

It has previously been observed that during the operation of a Raman cell laser system, arcing frequently occurs at the pump beam focus and decomposes the methane gas, leading to the formation of deposits on the cell windows. It was also believed that heating of the methane gas from the Raman scattering process contributed to this process. As discussed in further detail below, we have confirmed that arcing alone leads to methane decomposition. The decomposition of methane in a gas plasma, particularly in an arcing condition, can readily produce free methyl radicals ($CH_3\cdot$), as indicated in the following equation:

$$CH_4 \rightarrow CH_3\cdot + H\cdot$$ 

These methyl radicals are extremely chemically active and can readily interact with each other to form ethane, which may then decompose to free ethyl radicals that can react with other ethyl radicals or methyl radicals or other free radicals to form long chain hydrocarbons. This process is known in the art and is referred to as chain propagation. Progressively higher molecular weight products are formed. Free radical branching can quickly lead to the formation of unsaturated hydrocarbons which undergo plasma-induced polymerization to produce organic materials which deposit on the inside of the windows of the Raman cell. These deposits are formed within the laser beam footprint on the window, which suggests that surface heating of the window coating from the laser beam aids in the polymerization process. This deposition occurs slowly over a large number of shots and will gradually degrade cell performance. It is difficult to avoid arcing completely, particularly for short path length configurations, which are the preferred configurations for Raman cells. Consequently, this problem cannot simply be avoided.

In accordance with the present invention, this problem is solved by providing a catalytic composite comprising palladium on a titania substrate within the Raman cell in contact with the methane gas. When methyl radicals and hydrogen species are formed as indicated in the equation above, this catalytic composite promotes the recombination of the methyl radicals and hydrogen species to form methane. Thus, the chain propagation sequence described above is terminated. In addition, the catalyst promotes hydrogenation of any olefinic species which have been formed, to thus prevent further chain branching reactions which lead to high molecular weight deposits. Thus, the present catalytic composite promotes the hydrogenation of the various gas products formed by the decomposition of methane when it is exposed to arcing conditions.

A preferred catalytic composite in accordance with the present invention is formed by impregnating titania ($TiO_2$) pellets with palladium (Pd). The pellets are chosen to have a wide pore diameter which allows for rapid diffusion of the catalyst into the pellets. Pellets having a diameter of about 1/16 to ¼ inch (0.16 to 0.64 cm) are suitable for the present catalytic composite. Suitable $TiO_2$ pellets are available from Harshaw/Filtrol of Cleveland, Ohio or Norton Company of Akron, Ohio. The titania substrate in accordance with the present invention may be in a form other than pellets, such as a monolith, reticulated monolith, or plates. However the pellet form is preferred.

The $TiO_2$ pellets are impregnated, preferably by the incipient wetness technique, with a solution comprising a chemical complex of palladium and a suitable solvent, such as water. The impregnated pellets are dried, heated at about 200° C. in helium, and then calcined in flowing oxygen at about 400° C. It has been found that chloride-free noble metal salts, such as tetraammine-palladium (II) nitrate, $[Pd(NH_3)_4](NO_3)_2$, produce catalytic composites having catalytic performance superior to composites formed from chloride containing noble metal complexes. Using chloride free metal salts and the incipient wetness technique in accordance with the present invention, uniform distribution of the palladium throughout the titania substrate is produced. The palladium preferably comprises about 0.1 to 5 percent by weight of the composite. The term "impregnation" is used herein in its accepted meaning of forcing a liquid substance into the spaces of a porous solid. This impregnation maximizes the utilization of the substrate surface area in and throughout the entire pellet.

While the previous discussion has been focused on the impregnation of the metal salt into the substrate, it is not intended to so limit the present invention. Rather, the improved catalytic activity of the present method is achieved by using a palladium catalyst on a titania substrate where intimate contact between the catalyst and substrate is achieved by other means besides impregnation.

The above-described palladium on titania catalytic composite is placed within the Raman cell in contact with the methane gas. As is known in the art, a Raman cell comprises a hollow housing structure which has openings at opposite ends, to which are joined the optical windows which are transparent to the wavelengths of radiation produced by the pump laser and by the Raman cell. The gaseous methane scattering medium is contained within the sealed housing structure. In accordance with the present invention, there is also provided an improved Raman cell 10 comprising: a hollow housing structure 12 with openings at opposite ends, to which are joined optical windows 14 that are transparent to the previously noted wavelengths of radiation; a gaseous methane scattering medium 16 contained within the housing structure 12; and the above described palladium on titania catalytic composite 18, contained within holder 20 which is within and attached to housing structure 12. Optionally, a piezoelectric vibrator, (not shown) may be incorporated within the housing structure to aid in mixing the cell gas and thus assist in the bulk mass transfer of excited or olefinic species to the surface of the catalyst for hydrogenation.

It was found that the catalytic composite of the present invention produced suspended catalyst "dust" particles which intensified the arcing effect. In accordance with an alternative embodiment of the present invention, the dust is controlled by wrapping the composite of the present invention in a sheet of material which can filter the dust particles and which is unreactive with the catalyst, such as Nomex (a registered trademark of Donaldson Company, Inc. for a nylon product). The wrapped composite is then inserted into cylinders of perforated sheet metal. Two such cylinders in parallel arrangement were used.

In accordance with another alternative embodiment of the present invention, further improvement in inhibiting the formation of deposits on the cell window may be achieved by doping the methane fill gas with a small amount of hydrogen, in the amount of about 0.5 to 3 volume percent. This added hydrogen provides a plentiful supply of hydrogen to further promote the reaction of the methyl radicals with hydrogen as described above. In the tests described herein, the cell was flushed with hydrogen at 1 atmosphere (760mm) pressure before being pressurized with methane, which yielded about 1.5 volume percent of hydrogen at the cell pressure used.

To determine the effectiveness of the method of the present invention, tests were performed with and without the catalytic composite of the present invention. First, tests were performed without the catalytic composite in order to understand the polymer deposition problem itself. To accomplish these tests in a timely manner, an accelerated test method was implemented. Since the gas decomposition is believed to result from arcing at the pump beam focus, tests were run in a small volume Raman cell with intentionally induced arcing. A short focal length lens (F/16) at the cell input created the arcing. The arcing could be observed through side port windows which transversed the cell. After each test, a gas sample was drawn from the cell and analyzed by gas chromatography. The gas chromatograph utilized a flame ionization detector (FID) and was calibrated for the six lowest saturated hydrocarbons (methane through hexane) although no hydrocarbons with greater than four carbons were observed in the tests. The gas chromatograph was also calibrated for ethylene. The use of the small volume cell helped to concentrate the contaminant gases once they were formed. As few as 5,000 shots produced a measurable result. This enabled many tests to be run in a short period of time.

It was confirmed that arcing is a necessary condition for methane gas decomposition. Previously it was thought that energy imparted to the gas from the Raman scattering process might contribute in some way to methane decomposition, but no contaminant gases were observed in tests without arcing. Therefore, heating of the methane gas from the Raman scattering process by itself does not lead to methane decomposition or the resultant polymer deposition.

In order to characterize the extent of methane decomposition, the resultant contaminant gases were identified and their concentrations were measured. The test results with induced arcing are summarized in Table I. Tests completed without the catalyst of the present invention produced a considerable amount of ethylene, together with trace amounts of other olefins. In general, a relatively high concentration of ethylene was coincident with organic deposition on the Raman cell windows. The unidentified three and four carbon molecules listed in Table I had retention times near, but not exactly matching, that of propane and butane, respectively. These were assumed to be unsaturated three and four carbon molecules. After tests of 5,000 and 10,000 shots, predominantly ethylene with small amounts of ethane and unsaturated three and four carbon gases were found. Ethylene was produced in concentrations of about 200 to 300 parts per million (ppm) per 10,000 shots. The unsaturated three and four carbon gases formed in concentrations of about 10 (ppm) per 10,000 shots.

TABLE I

COMPARATIVE TEST DATA FOR GAS PHASE COMPOSITION
Gas Phase Concentration (ppm on mole basis)

|  | Test | | | |
|---|---|---|---|---|
|  | No Catalyst | | PD Catalyst* | |
|  | | | | 20,000 Shots |
| Component | 5,000 Shots | 10,000 Shots | 5,000 Shots | 1.5 Vol. % $H_2$ |
| Ethylene | 100 to 120 | 270 | 5 | 0 |
| Ethane | 4 to 6 | 12 | 62 | 424 |
| Propane | 0 | 0 | 1 | 20 |
| Butane | 0 | 0 | 2 | 24 |
| Unsaturated C-3 | 2 to 6 | 13 | 0 | 0 |
| Unsaturated C-4 | 2 to 4 | 12 | 0 | 0 |

*Pd on $TiO_2$ catalytic composite

For purposes of comparison, the same tests were performed, using the Pd on $TiO_2$ catalytic composite in accordance with the present invention. The catalytic composite was prepared as described in Example 1 herein. As indicated in Table I, using the method of the present invention, predominately saturated gas phase hydrocarbons were detected and no window deposits were formed. Moreover, the addition of 1.5 volume percent of hydrogen gas in the methane gas fill in accordance with the present method aided the hydrogenation process by flooding the reaction with a plentiful supply of hydrogen.

In summary, these tests indicated that the method of the present invention is totally effective in inhibiting the formation of organic deposits on the methane cell windows. Whereas light to moderate amounts of polymeric deposits formed on the cell windows in tests without the present catalyst, no window deposit formed in tests with the present catalyst, whether or not hydrogen doping was added.

Examples of practice of the present invention are as follows.

EXAMPLE 1

This example illustrates a method for the preparation of a catalytic composite used in the method of the present invention, comprising palladium on a titania substrate or support.

The titania support was provided as pellets comprising one-eighth inch (0.32 cm) extrudates obtained from Harshaw/Filtrol of Cleveland, Ohio. Using the Brunauer, Emmett, and Teller (BET) method, the surface area was determined to be 205 meters$^2$ per gram.

The incipient wetness technique was used to impregnate blank (fresh) titania ($TiO_2$) pellets with tetraamminepalladium (II) nitrate. The specific pore volume of the titania pellets was determined by measuring the saturation volume (pore volume as measured for a specific solvent) volumetrically with water. Once this saturation volume was known, a volumetric solution of the palladium salt was prepared with a prescribed concentration level. This quantitative solution was then mixed with the appropriate mass of blank titania pellets, resulting in the physical adsorption of the solution on the surface and into the interior of the pellets. The Pd/$TiO_2$ catalyst was prepared with 30.976 g $TiO_2$ pellets and 13.3 ml of a solution containing 4.595 g of palladium salt per ml water. A slight excess (about 5% of solution was used in the impregnation procedure to allow uniform and complete saturation of the titania pellets. The residual solution was retained for recovery and analysis. The catalytic composite preparation was completed by slowly drying the "wetted" catalytic composite in a flowing air hood, followed by activation in flowing helium at about 200° C. for 2 hours, and calcination in flowing oxygen at about 400° C. for 4 hours. The metal loading was determined by a material balance, taking into account the concentration of metal in the solution, the saturation volume of the titania support material, and the residual metal recovered. The composite was determined to comprise 4.0 weight percent Pd.

This catalytic composite was tested for catalytic activity as previously described and as discussed in Example 2.

EXAMPLE 2

To provide a more extended life test of the method of the present invention, the test previously described with regard to Table I was repeated at 10 hertz for one million shots. The catalyst was prepared as described in Example 1. The methane gas fill was doped with 1.5 volume percent of hydrogen. The Raman cell comprised the present catalytic composite, the housing structure, the optical windows, and a piezoelectric vibrator. The catalytic composite of the present invention was wrapped in Nomex and placed in two parallel perforated metal cylinders. The Raman output energy was steady at 48 to 53 millijoules with a constant pump laser input throughout the test. After one million shots, there was no evidence of any deposit on the cell window, and a gas sample taken from the cell after completion of the test contained only methane and 100 parts per million of ethane. A previous life test under similar conditions but without a catalyst had resulted in cell failure due to window deposits after 500,000 shots.

While the previous discussion has been limited to Raman laser cells comprising methane as the scattering medium, it is not intended to so limit the present invention. Rather the method of the present invention may be used to inhibit the plasma-induced polymerization of methyl radicals and their resulting products, or methane plasma particles in environments other than in a Raman cell, such as in a methane Brillouin scattering cell for optical phase conjugation.

Having thus described exemplary embodiments of the present invention, it should be noted by those skilled in the art that the disclosures within are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A method for inhibiting the formation of deposits on the inside surface of the window of a Raman cell comprising methane as the scattering medium wherein said methane is exposed to arcing conditions, said method comprising providing within said Raman cell a catalytic composite comprising palladium on a titania substrate whereby said catalytic composite promotes the hydrogenation of radicals formed during said arcing and thereby inhibits the reaction of said radicals to form said deposits.

2. The method as set forth in claim 1 wherein said palladium comprises about 0.1 to 5 percent by weight of said catalytic composite.

3. The method as set forth in claim 1 wherein said titania comprises about 90 percent anatase phase and about 10 percent rutile phase.

4. The method as set forth in claim 1 wherein said substrate comprises pellets.

5. The method as set forth in claim 4 wherein said pellets have a diameter within the range of about 1/16 to ¼ inch (0.16 to 0.64 cm).

6. The method as set forth in claim 1 wherein said catalyst is impregnated in said substrate.

7. The method as set forth in claim 1 further comprising mixing said methane with hydrogen gas in the amount of about 0.5 to 3.0 percent by volume.

8. The method as set forth in claim 7 wherein said hydrogen gas is present in the amount of about 1.5 percent by volume.

9. A method for inhibiting the polymerization of gas products formed by a methane plasma comprising exposing said gas products to a catalytic composite comprising palladium on a titania substrate whereby said catalytic composite promotes the hydrogenation of said gas products to thereby inhibit said polymerization.

10. The method as set forth in claim 9 wherein said palladium comprises about 0.1 to 5 percent by weight of said catalytic composite.

11. A Raman laser cell comprising:
(a) a hollow housing structure, having openings at opposite ends thereof;
(b) two optical windows, each disposed at one said opposite end of said housing structure and being transparent to radiation of a chosen wavelength;
(c) a gaseous scattering medium comprising methane contained in said housing structure; and
(d) a catalytic composite comprising palladium on a titania substrate disposed within said housing structure.

12. The Raman laser cell as set forth in claim 11 further comprising a perforated cylinder for containing said catalytic composite and controlling suspended particles produced therefrom.

13. The Raman laser cell as set forth in claim 11 wherein said methane is mixed with hydrogen gas in the amount of about 0.5 to 3.0 percent by volume.

14. The Raman laser cell as set forth in claim 11 wherein said palladium comprises about 0.1 to 5 percent by weight of said catalytic composite.

15. The Raman laser cell as set forth in claim 11 further comprising mixing means located within said housing structure for mixing said gaseous medium to provide improved contact with said catalytic composite.

* * * * *